(No Model.)
J. R. STEITZ.
HAY RACK.
No. 272,791. Patented Feb. 20, 1883.
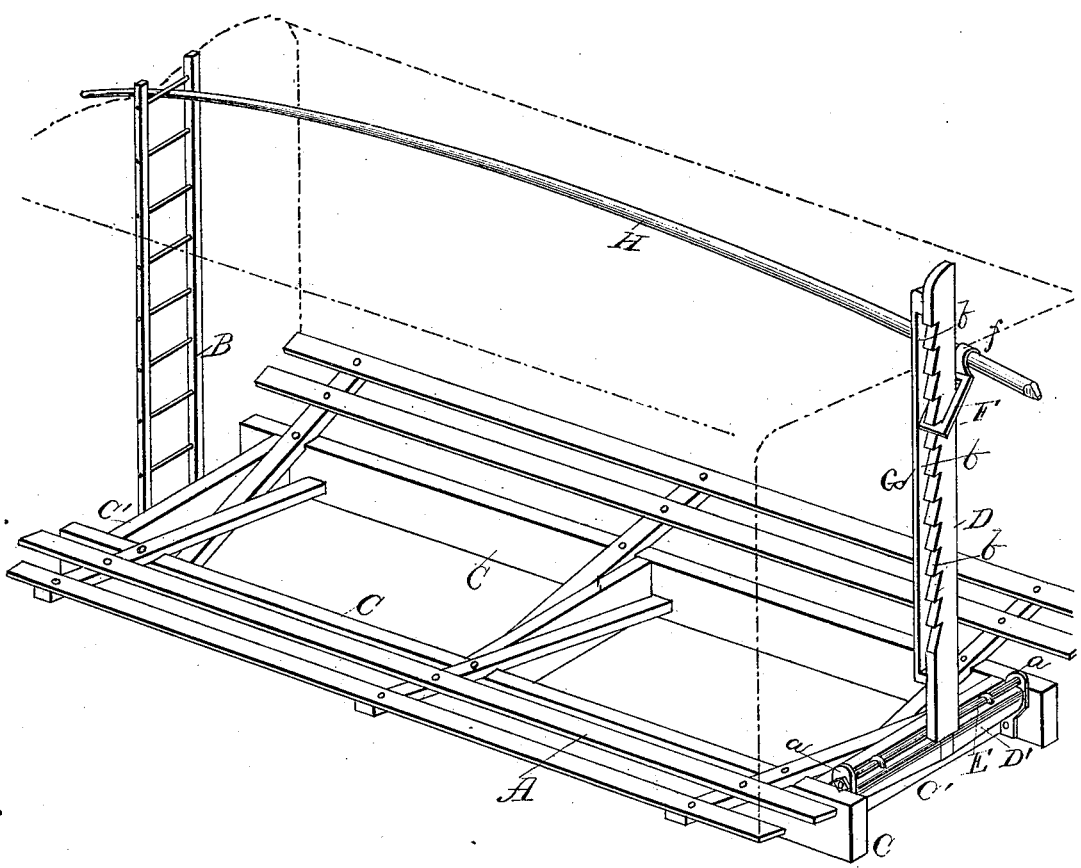
Witnesses:
E. G. Asmus
C. B. Story
Inventor:
Jacob R. Steitz
By
Stout & Underwood,
Attorneys.

UNITED STATES PATENT OFFICE.

JACOB R. STEITZ, OF BAY VIEW, WISCONSIN.

HAY-RACK.

SPECIFICATION forming part of Letters Patent No. 272,791, dated February 20, 1883.

Application filed November 23, 1882. (No model.)

*To all whom it may concern:*

Be it known that I, JACOB R. STEITZ, of Bay View, in the county of Milwaukee, and in the State of Wisconsin, have invented certain new and useful Improvements in Hay-Racks; and I do hereby declare that the following is a full, clear, and exact description thereof.

My invention relates to hay-racks; and it consists in a device by which the binding-pole is locked to hold the hay in place on the wagon.

The drawing is a perspective view of my invention as attached to a hay-rack.

A is the rack, which may be of any known construction, and which is provided, as hay-racks usually are, with a front ladder, B. C are the longitudinal sills of the rack, and C' the cross-sills, and just in the rear of the rear cross-sill I pivot a ratchet-stake, D, by means of a round bar, E, the ends of which extend out through ears $a$, that are secured to the rear ends of the sills C. The base D' of the stake D is hung from the bar E, and is heavy enough to steady the stake and give stability to it, as well as to counterbalance it, that it may be easily raised to a vertical from the bed of the rack, in which it is designed to lie when the rack is empty. This stake is provided preferably with ratchet-teeth $b$, and over it I pass a binding-loop, F, that carries a hook, $f$, and then I attach a guard, G, to the inner face of stake D, the office of which is to prevent the hay from interfering with the action of loop F. H is the binding-pole, which does not differ from those already in use, and the front ladder is such as hay-racks are usually provided with.

The operation of my device is very simple, and is as follows: When hay is to be loaded onto the rack I lift stake D from the bed and carry it up until it falls back of the axis of its pivot, and then, after the hay has been loaded, I insert an end of the pole H beneath one of the rounds of the ladder, and, bearing down upon the other end, I force it beneath and into engagement with the hook $f$ of the loop F, and then I carry the loop F to a horizontal position and drop it down as far on the stake as is necessary to confine the pole tightly over the hay, and just as soon as the loop is released the pole will draw its hooked end up, and, carrying the loop out of a horizontal position, cause it to bind on the stake and hold all the harder for the draft that is on its hook; but when the hay is to be unloaded it will only be necessary for the driver to bear down upon the rear end of the pole until the loop is again brought to a horizontal position, or at right angles to the stake, when the loop will easily become disengaged from the teeth of the stake and will permit the pole to be disengaged from its hook.

What I claim as my invention, and desire to secure by Letters Patent, is—

1. The stake D, having guard G, in combination with the hooked loop, adapted to lock the binding-pole without danger of displacement from the load, as set forth.

2. In combination with the sills of a hay-rack, the bar E, pivoted in ears $a$, secured to said sills, the base D', suspended from said bar, and the stake D, rising from said base, and provided with the ratchet-teeth $b$ and hooked loop F, substantially as set forth.

3. In a hay-rack, the combination of the stake D, having pivoted counterbalancing-base and ratchet-teeth $b$, with the guard G, hooked loop F, ladder B, and binding-pole H, substantially as set forth.

In testimony that I claim the foregoing I have hereunto set my hand, on this 30th day of October, 1882, in the presence of two witnesses.

JACOB R. STEITZ.

Witnesses:
STANLEY S. STOUT,
H. G. UNDERWOOD.